(12) United States Patent
Conrad et al.

(10) Patent No.: US 6,391,095 B1
(45) Date of Patent: May 21, 2002

(54) AIR FLOW PASSAGE FOR A CYCLONIC SEPARATOR AND VACUUM CLEANER HAVING SAME

(75) Inventors: Wayne Ernest Conrad; Helmut Gerhard Conrad; Ted Szyluwiec, all of Hampton (CA)

(73) Assignee: G.B.D. Corp. (KY)

( * ) Notice: Subject to any disclaimer, the term of this patent is extended or adjusted under 35 U.S.C. 154(b) by 0 days.

(21) Appl. No.: 09/480,168

(22) Filed: Jan. 10, 2000

Related U.S. Application Data

(63) Continuation-in-part of application No. 09/227,534, filed on Jan. 8, 1999, now Pat. No. 6,141,826.

(51) Int. Cl.[7] .............................. B01D 45/16; A47L 9/16
(52) U.S. Cl. ...................... 95/271; 55/459.1; 55/459.2; 55/449; 55/DIG. 3; 15/350; 15/352; 15/353
(58) Field of Search ......................... 55/459.1, 459.2, 55/449, DIG. 3; 15/350, 352, 353; 95/271

(56) References Cited

U.S. PATENT DOCUMENTS

| | | | |
|---|---|---|---|
| 3,171,807 A | 3/1965 | Neuman | |
| 3,398,513 A | * 8/1968 | Thompson | .................. 55/348 |
| 4,364,146 A | 12/1982 | Bowerman | |
| 4,593,429 A | 6/1986 | Dyson | |
| 4,662,909 A | * 5/1987 | Durr | ......................... 55/459.1 |
| 5,227,061 A | 7/1993 | Bedsole | |
| 5,525,396 A | * 6/1996 | Rudolph et al. | ........... 55/459.1 |
| 5,779,745 A | * 7/1998 | Kilstrom | ...................... 55/337 |
| 5,908,493 A | 6/1999 | Krymsky | |
| 6,141,816 A | 11/2000 | Burnett | |

FOREIGN PATENT DOCUMENTS

| | | |
|---|---|---|
| DE | 195 06 506 A1 | 8/1996 |
| DE | 196 50 407 A1 | 6/1998 |
| EP | 0 815 788 A2 | 1/1998 |
| FR | 1.094.603 | 12/1954 |
| JP | 59-49817 | * 3/1984 ................ 55/459.1 |
| WO | 10452-27 | 1/2000 |

* cited by examiner

Primary Examiner—Robert A. Hopkins

(57) ABSTRACT

A cyclonic separation device is provided having improved pressure loss characteristics. A fluid supply conduit in flow communication with an inlet to a cyclone is located and configured to extend longitudinally through a central portion of the cyclone, whereby the sharp bending of the conduit may be reduced, thereby reducing pressure losses in the device, without unduly interfering with the cyclonic flow within the cyclone. The present invention may be adapted for use with cyclonic separation devices of all types, including single- and multi-stage cyclonic separators. The cyclonic separation device may be incorporated in a vacuum cleaner such as an upright vacuum cleaner. A three dimensional conduit which is optionally used with a cyclonic separator is provided.

48 Claims, 13 Drawing Sheets

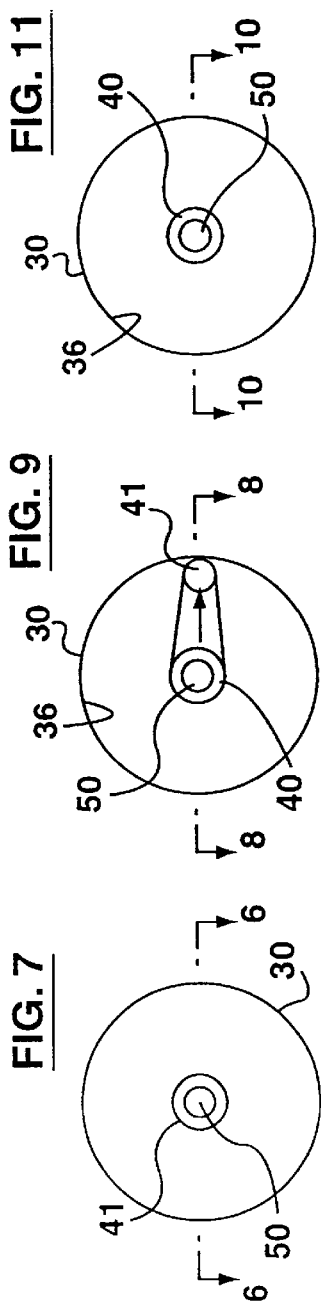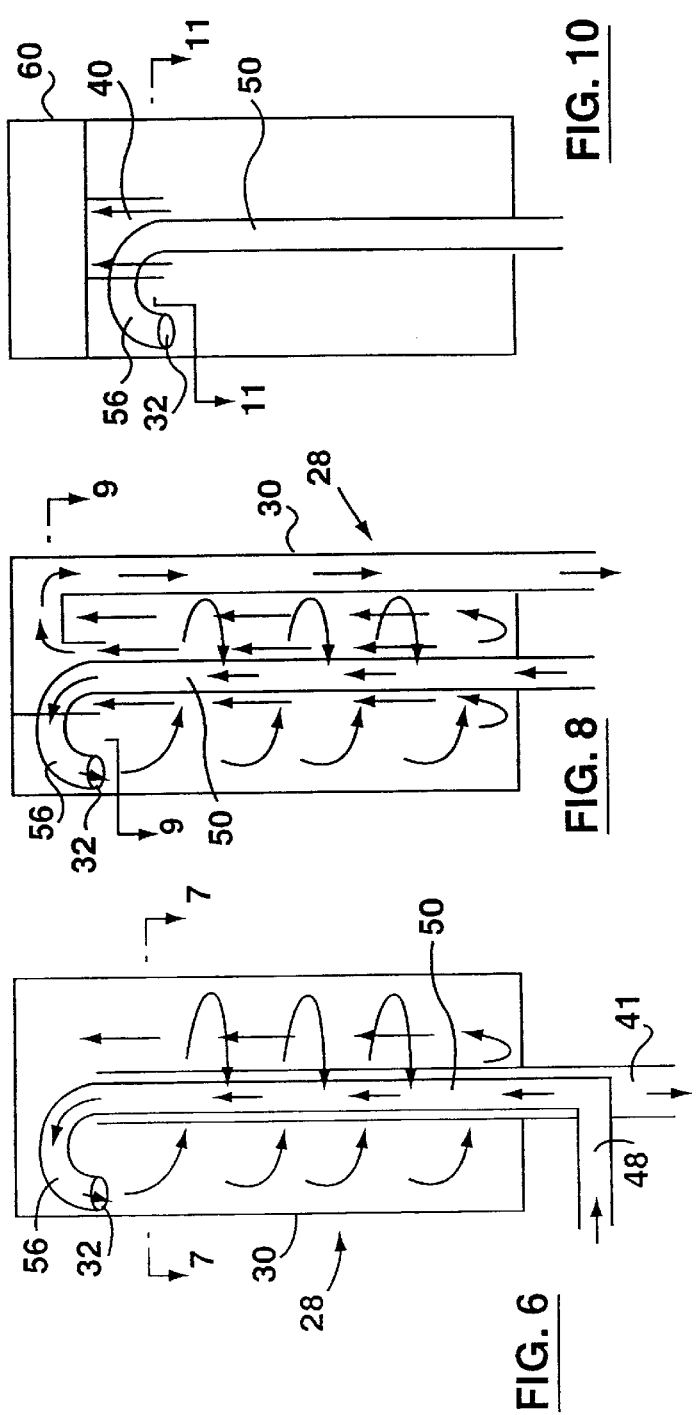

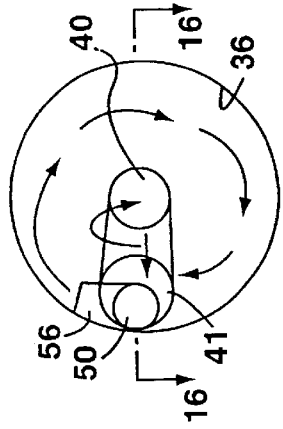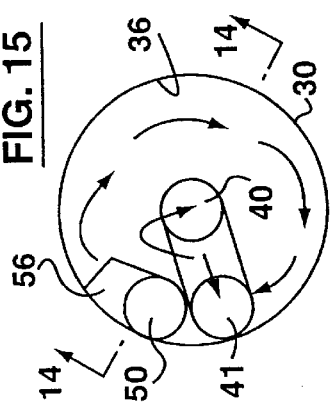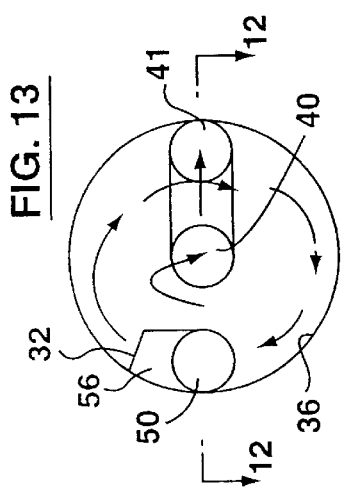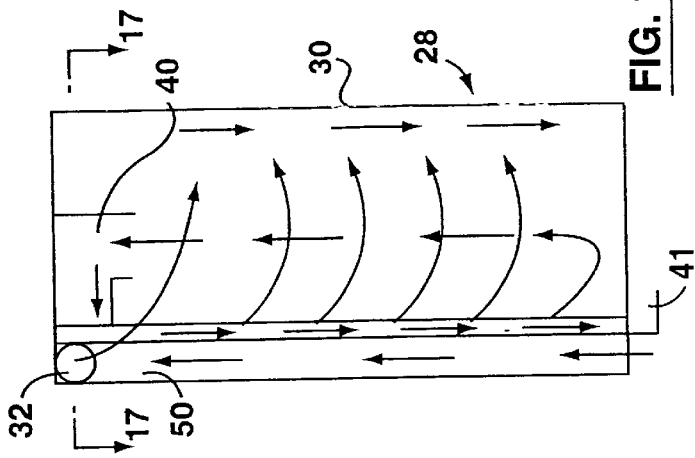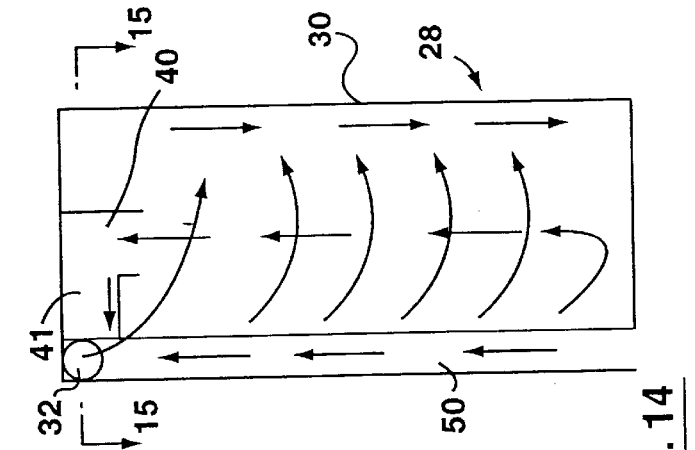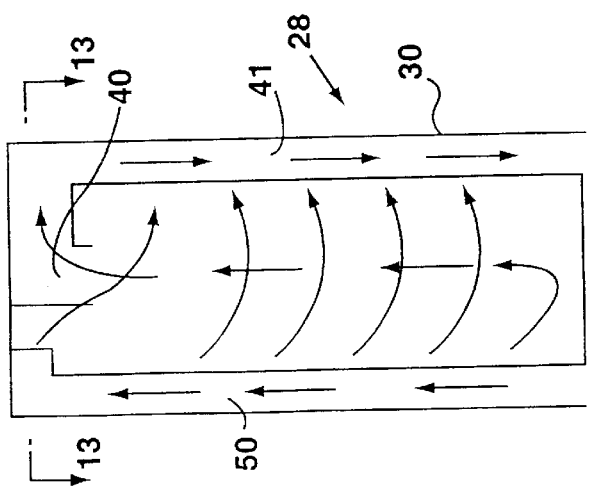

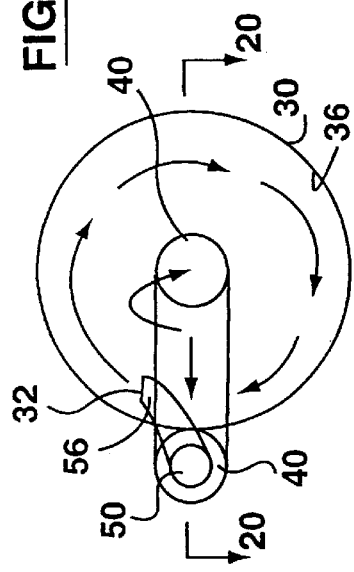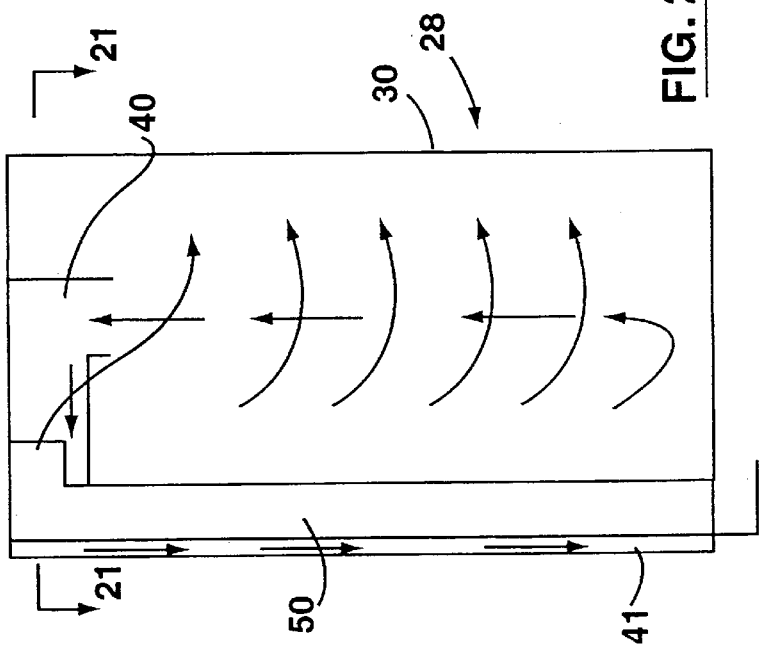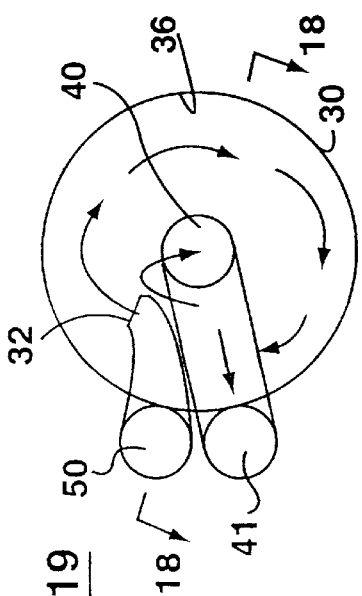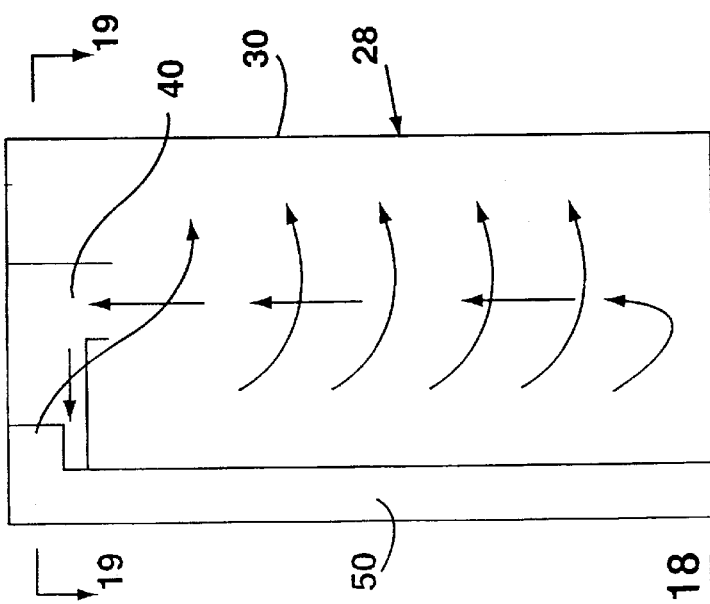

AIR FLOW PASSAGE FOR A CYCLONIC SEPARATOR AND VACUUM CLEANER HAVING SAME

This application is a continuation-in-part of application Ser. No. 09/227,534 filed on Jan. 8, 1999, now U.S. Pat. No. 6,141,826.

FIELD OF THE INVENTION

The present invention relates generally to cyclonic separators. In one particular application, the invention relates to a vacuum cleaner which uses the cyclonic separation of dirt from an air flow as the primary dirt separation mechanism.

BACKGROUND OF THE INVENTION

The use of a cyclone, or multiple cyclones connected in parallel or series, has long been known to be advantageous in the separation of particulate matter from a fluid stream. Typically, a relatively high speed fluid stream is introduced tangentially to a generally cylindrical or frusto-conical container, wherein the dirty air stream is accelerated around the inner periphery of the container. The centrifugal acceleration caused by the travel of the fluid in a cyclonic stream through the cyclone causes the particulate matter to be disentrained from the fluid flow and, eg., to collect at the bottom of the container. A fluid outlet is provided for the extraction of the fluid from the centre of the top of the cyclone container, as is well known in the art.

A typical flow path in a cyclone separator is as follows. Fluid to be treated is introduced tangentially at a fluid inlet located at the upper end of the cyclone container (if the cyclone container is vertically disposed). The fluid stream rotates around the inner surface of the cyclone container, and spirals generally downwardly around the inner surface. At the bottom end of the cyclone container the fluid stream travels radially inwardly, generally along the bottom of the container and then turns upwardly and proceeds vertically up and out of the cyclone container. The particulate matter separating action of the cyclonic flow occurs substantially around the inner surface. Once the air moves inwardly to the centre of the container, and upwardly there through, there is little or no dirt separation achieved.

Various types of vacuum cleaners are traditionally produced. These include built in vacuum cleaners, canister vacuum cleaners and upright vacuum cleaners. Upright vacuum cleaners have a ground engaging portion (a cleaning head) and an upwardly extending or main body portion. The ground engaging portion typically has wheels for movement of the cleaning head across a floor and a suction inlet for the intake of dirty air into the vacuum cleaner. The upwardly extending portion comprises the filter means for removing dirt which is entrained in the air. The upwardly extending portion generally has a handle for guiding the vacuum cleaner across the floor.

Traditionally in upright vacuum cleaners, the motor to draw the dirty air through the vacuum cleaner is positioned in the ground engaging head and the upward extending portion is pivotally mounted to the upper portion of the ground engaging member at a position adjacent the motor.

The advantages of cyclonic separation have been combined with an upright vacuum cleaner to provide a household cyclonic vacuum cleaner, as shown in U.S. Pat. No. 4,593,429 to Dyson. As shown in FIG. 1, this vacuum cleaner 10 essentially comprises a large, outer cylindrical cyclone 12, with an inner cyclone 14 nested therein, which is mounted on a floor-cleaning head and provided with a push handle for convenient movement of the unit. A motor, located in the floor cleaning head, draws air through the cleaning head and into an intake conduit 16, which delivers air to the dirty air inlet 18 of the outer cyclone container 12. From the outer cyclone the air flows into inner, nested dust separating cyclone 14, and from there, continues on through the vacuum motor, which is positioned in the ground engaging member, to a clean air exhaust port.

The air intake conduit 16 connects the floor cleaning head and the dirty air inlet in air flow communication. Air intake conduit 16 extends upwardly along the outside of outer cyclone container 12 generally parallel to the longitudinal axis of the cyclones 12, 14. At a position adjacent air inlet 18 to outer cyclone 12, air intake conduit 16 bends 90° twice to travel inwardly and to provide a tangential air flow to air inlet 18 of outer cyclone container 12.

In use, air intake conduit 16 may become blocked. If the blockage occurs at a midpoint of the conduit, it may be difficult to clear the blockage. While a clean out port may be provided, the port may not be located near where the blockage occurs. Further, the addition of a port increases the cost and complexity of the manufacture of the product.

A bend in a conduit for a fluid causes a turbulent pressure loss in the conduit as the fluid travels through the bend in the conduit and the greater the sharpness of the bend, the greater the pressure loss. The pressure loss in the air flow decreases the amount of suction which can be generated at the cleaning head of the vacuum cleaner for any given motor in the vacuum cleaner and therefore the efficiency of the vacuum cleaner.

SUMMARY OF THE INVENTION

In accordance with the instant invention, there is provided a vacuum cleaner having a source of dirty air to be treated and a housing, the cyclonic separator comprising a cyclone removably mounted in the housing and having a bottom, a fluid inlet, a wall having an inner surface and a longitudinally extending axis; and a fluid supply conduit extending along the length of the cyclone from the bottom to the fluid inlet, the fluid supply conduit conveying the dirty air substantially axially to the fluid inlet, the fluid supply conduit communicating with the source of dirty air when the cyclonic separator is in use, the fluid inlet redirecting the dirty air from an axial flow to a tangential flow and the fluid inlet is positioned within the cyclone.

In one embodiment, the fluid supply conduit extends through a central portion of the cyclone. The fluid supply conduit preferably extends coaxially with the axis of the cyclone and the fluid inlet preferably extends outwardly to the inner surface.

In another embodiment, the fluid inlet includes a curved portion without any 90° elbows.

In another embodiment, the fluid inlet comprises at least a portion that extends in a continuous curve.

In another embodiment, the fluid inlet is curved in a first direction towards the inner surface of the wall and is curved in a second direction to introduce the dirty air tangentially to the cyclone. The fluid inlet may be curved so as to sequentially redirect the air in the first direction and then the second direction. Preferably, the fluid inlet is curved so as to simultaneously redirect the air in the first direction and the second direction.

In another embodiment, the fluid inlet has a curved portion to impart a rate of change of direction in the fluid travelling there through in two axis simultaneously.

In another embodiment, the fluid supply conduit extends longitudinally through the cyclone and the cyclone is removably mounted in the housing.

In another embodiment, the downstream end of the fluid inlet extends substantially horizontally.

In another embodiment, the downstream end of the fluid inlet extends towards the bottom of the cyclone.

In another embodiment, the downstream end of the fluid inlet extends towards the bottom of the cyclone at an angle of up to 10° from a plane perpendicular to the axis.

In another embodiment, the cyclone has an outlet having a wall and a portion of the fluid inlet is nested within the outlet and a portion of the fluid inlet is positioned exterior the outlet.

In accordance with the instant invention, there is also provided a cyclonic separator having a source of fluid to be treated, the cyclonic separator comprising a cyclone having a bottom, a fluid inlet, a wall having an inner surface and a longitudinally extending axis, the fluid inlet having an upstream end and a downstream end; and, a fluid supply conduit extending substantially along the axis of the cyclone from the bottom to the upstream end of the fluid inlet, the fluid supply conduit communicating with the source of fluid when the cyclonic separator is in use, the fluid inlet is curved in a first direction towards the wall and is curved in a second direction to introduce the fluid tangentially to the cyclone.

In one embodiment, the cyclone has an outlet having a wall and at least a portion of the fluid inlet is nested within the outlet and extends through the wall of the outlet.

In another embodiment, the inlet comprises a duct extending from point S1 to point S2 and comprises a space curve around which the conduit is formed wherein the gradient of the space curve has at least two non-zero components which vary along the arc length of the curve. Preferably, the space curve comprises a helical segment.

Preferably, the helical segment is defined by $S(t)=(G)*(\cos(t),\sin(t),t)\cdot(x,y,z)$ whereby (a) the gradient of the space curve has at least two non-zero components which vary along the arc length of the curve
(b) $t1<t<t2$
(c) $S(t2)$ is equal to S1; and,
(d) $S(t2)$ is equal to S2.

Preferably, the duct comprises an envelope formed by a radius r out from the central space curve which is itself formed about a construction cylinder having a radius R and an axis wherein the conduit the duct has a radius r where r<R and the space curve at S1 smoothly becomes a straight line coincident with the axis of the construction cylinder.

Preferably, the space curve at S2 smoothly becomes a straight line coincident with the derivative of S(t) at point S2 with respect to the parameter t.

In accordance with the instant invention, there is also provided a cyclonic separator having a source of fluid to be treated, the cyclonic separator comprising cyclone separation means having a longitudinally extending axis and a length; fluid supply conduit means extending substantially along the length of the cyclone separation means, the fluid supply conduit means communicating with the source of fluid when the cyclonic separator is in use; and, fluid inlet means for redirecting the fluid from a substantially axial flow for introduction tangentially to the cyclone means without any 90° elbows.

In another embodiment, the cyclonic separator further comprises housing means for removably receiving the cyclonic separation means wherein the cyclone separation means has outlet means having a wall and a portion which is removable with the cyclone separation means from the housing means and the fluid inlet means passes through the wall of the outlet means.

In accordance with the instant invention, there is also provided a method comprising providing a fluid having a first element and a second element; conveying the fluid in a conduit longitudinally through a cyclone having a longitudinal axis and a longitudinally extending surface; conveying the fluid in a conduit laterally to the longitudinally extending surface; and, introducing the fluid into the cyclone and passing the fluid through the cyclone to remove at least a portion of the first element from the fluid and obtain at least one treated stream having a reduced concentration of the first element.

In one embodiment, the method further comprises conveying the fluid centrally through the cyclone.

In another embodiment, the method further comprises conveying the fluid around at least a portion of the longitudinal axis of the cyclone as the fluid passes outwardly from the central portion.

In another embodiment, the method further comprises providing centrifugal acceleration to the fluid as it passes outwardly from the central portion.

In accordance with the instant invention, there is also provided a fluid supply conduit comprising a curved portion to impart a rate of change of direction in the fluid travelling there through in two axis simultaneously.

In accordance with the instant invention, there is also provided a method comprising providing a fluid having a first element and a second element; conveying the fluid to a cyclone; introducing the fluid through an inlet to the cyclone to impart a rate of change of direction in the fluid travelling there through in two axis simultaneously; and passing the fluid through the cyclone to remove at least a portion of the first element from the fluid and obtain at least one treated stream having a reduced concentration of the first element.

BRIEF DESCRIPTION OF THE DRAWINGS

For a better understanding of the present invention, and to show more clearly how it may be carried into effect, reference will now be made by way of example to the accompanying drawing which show a preferred embodiment of the present invention, in which:

FIG. 6 is a cross-section along line 6—6 in FIG. 7 of a further alternate preferred embodiment of the instant invention;

FIG. 7 is a cross-section along the line 7—7 in FIG. 6;

FIG. 8 is a cross-section along line 8—8 in FIG. 9 of a further alternate preferred embodiment of the instant invention;

FIG. 9 is a cross-section along the line 9—9 in FIG. 8;

FIG. 10 is a cross-section along line 10—10 in FIG. 11 of a further alternate preferred embodiment of the instant invention;

FIG. 11 is a cross-section along the line 11—11 in FIG. 10;

FIG. 12 is a cross-section along line 12—12 in FIG. 13 of a further alternate preferred embodiment of the instant invention;

FIG. 13 is a cross-section along the line 13—13 in FIG. 12;

FIG. 14 is a cross-section along line 14—14 in FIG. 15 of a further alternate preferred embodiment of the instant invention;

FIG. 15 is a cross-section along the line 15—15 in FIG. 14;

FIG. 16 is a cross-section along line 16—16 in FIG. 17 of a further alternate preferred embodiment of the instant invention;

FIG. 17 is a cross-section along the line 17—17 in FIG. 16;

FIG. 18 is a cross-section along line 18—18 in FIG. 19 of a further alternate preferred embodiment of the instant invention;

FIG. 19 is a cross-section along the line 19—19 in FIG. 18;

FIG. 20 is a cross-section along line 20—20 in FIG. 21 of a further alternate preferred embodiment of the instant invention;

FIG. 21 is a cross-section along the line 21—21 in FIG. 20;

DETAILED DESCRIPTION OF THE PREFERRED EMBODIMENT

The following description of improvements in cyclone separators is described in their use with a vacuum cleaner and in particular an upright vacuum cleaner. It will be appreciated that the improvements in cyclonic separators described herein may be used with canister vacuum cleaners, central vacuum cleaners, back pack vacuum cleaners as well as cyclonic separation devices of any sort, including industrial dust collection systems and liquid/liquid, liquid/gas and gas/gas separation systems. For example, they may be used with single or multiple stage of filtration assemblies, and may even be utilized where nested serial cyclones are employed.

Figure 1:
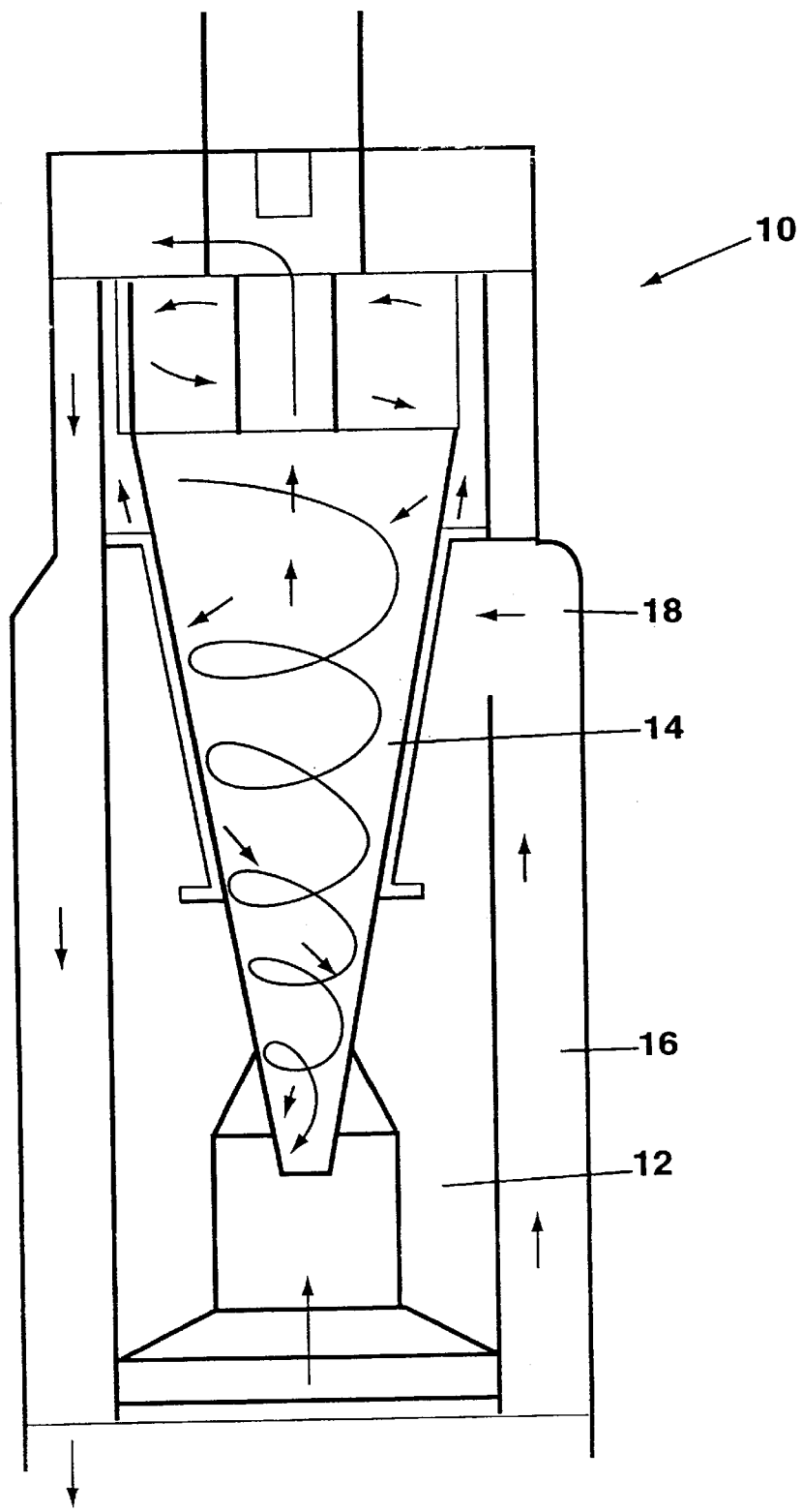
FIG. 1 is a cross-sectional side elevation of an upright cyclonic vacuum cleaner with an air intake conduit according to the prior art.
Figure 2:
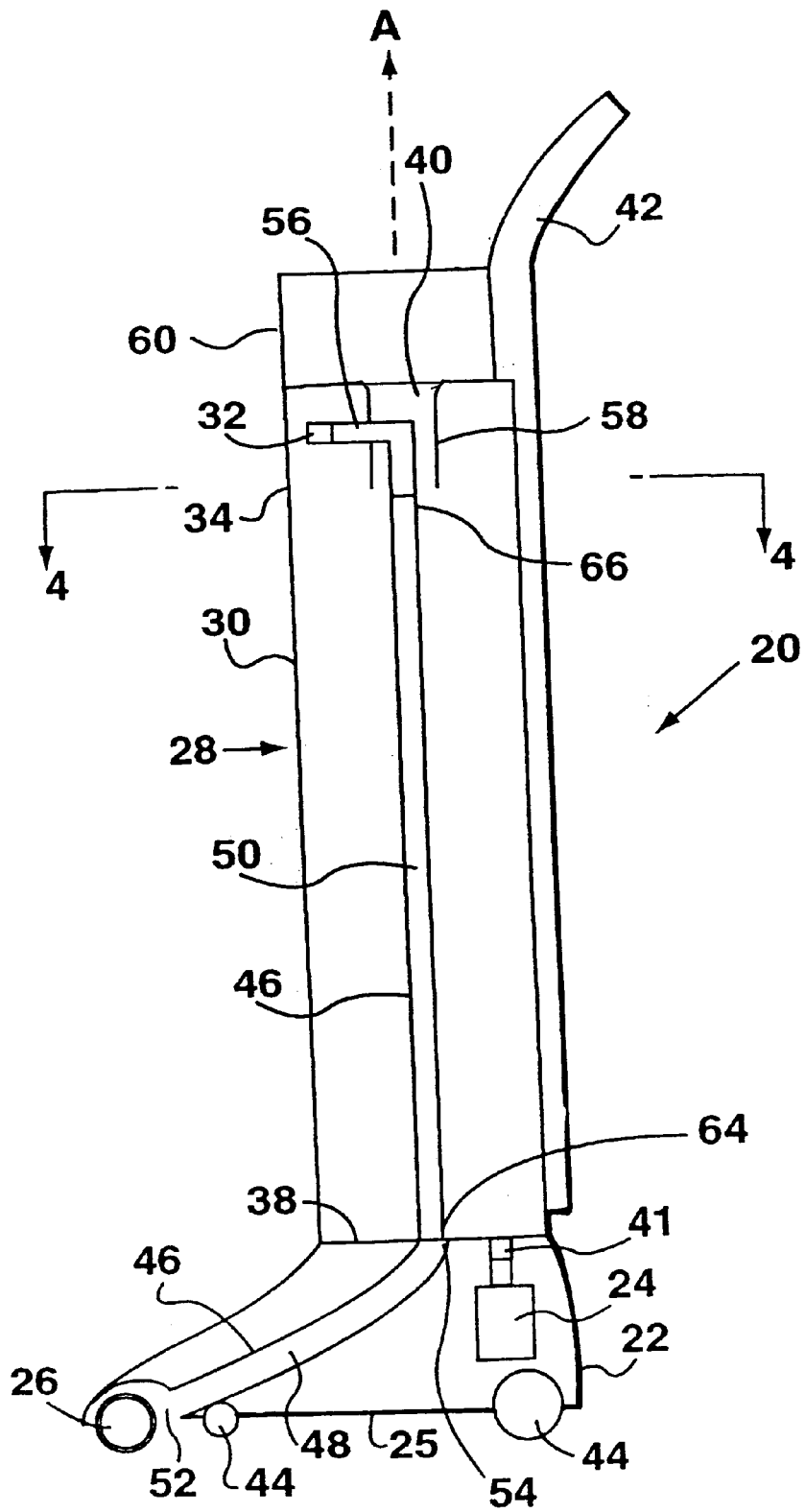
FIG. 2 is a cross-section along line 2—2 in FIG. 4 of an upright cyclonic vacuum cleaner with an air intake conduit according to the present invention.
Figure 3:
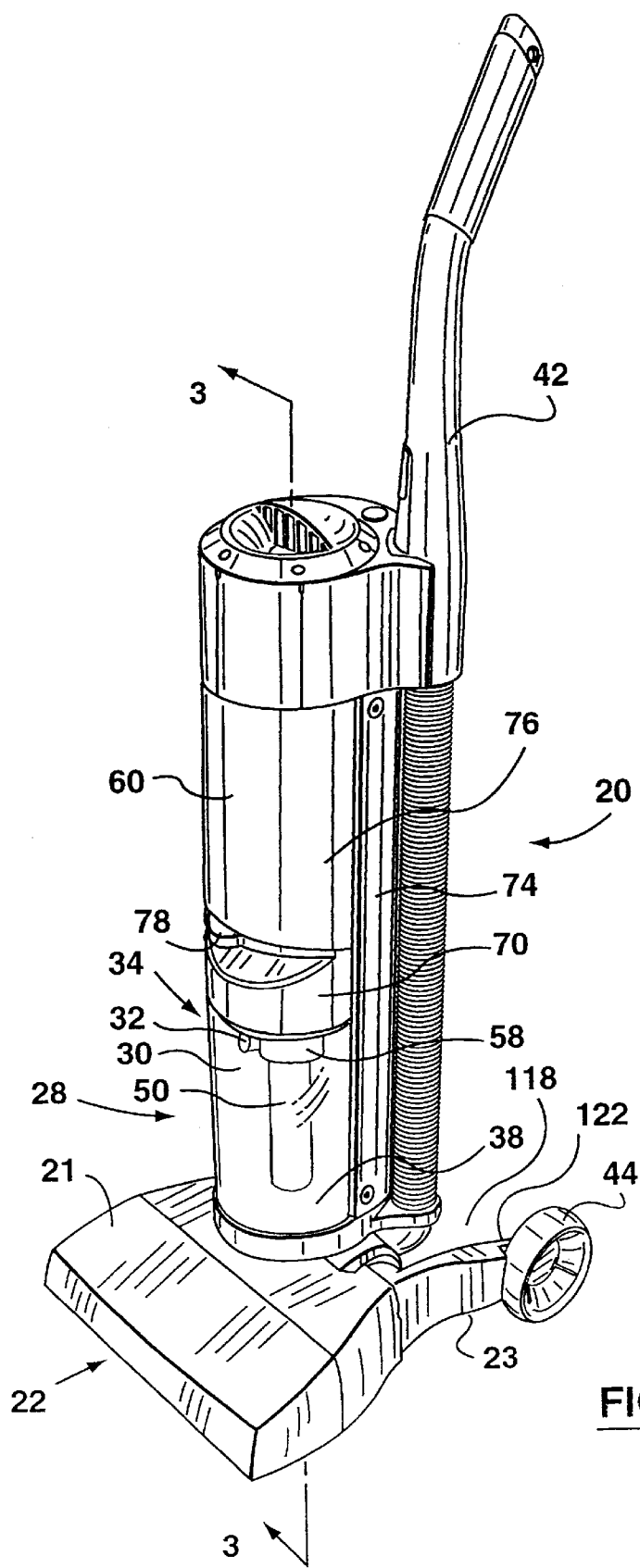
FIG. 3 is a perspective view of an upright vacuum cleaner according to the instant invention.
Figure 3A:
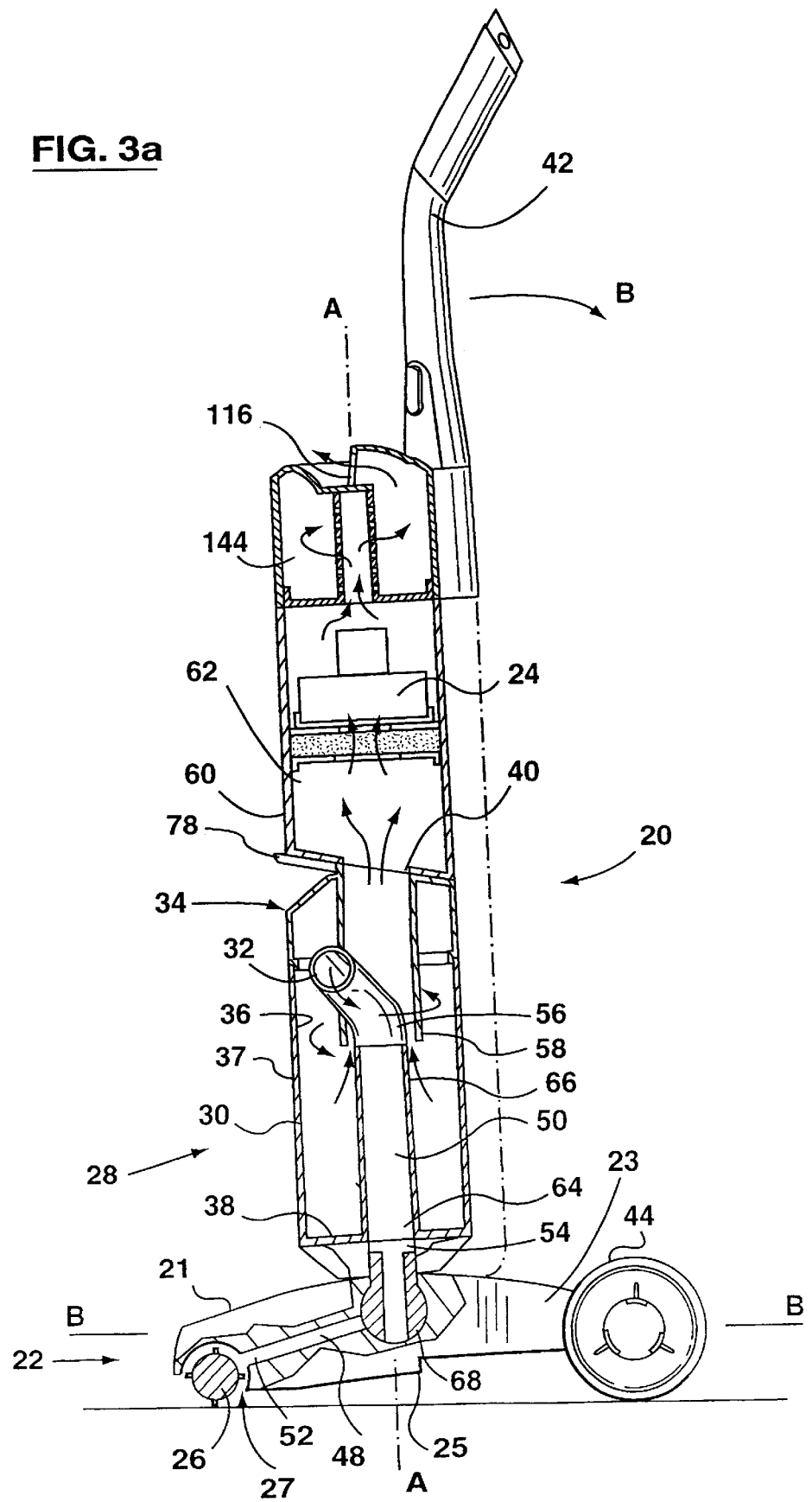
FIG. 3a is a cross-section along line 3—3 in FIG. 3 of an alternate preferred embodiment of an upright cyclonic vacuum cleaner with an air intake conduit according to the present invention.

An upright cyclonic vacuum 20 according to the present invention is shown in the FIGS. 2, 3 and 3a. In the embodiment of FIG. 2, the motor is positioned in the cleaning head and the cleaned air is conveyed to the motor for cooling the motor. According to the embodiment of FIGS. 3 and 3a, the motor is positioned in the upper body portion of the vacuum cleaner. If the vacuum cleaner is a canister vacuum cleaner or a central vacuum cleaner, then the cleaning head may be in air flow communication with the cyclone chamber via a flexible hose.

Referring to the embodiment of FIG. 2, a floor cleaning head 22, which may be any known in the art, is provided at the lower end of cleaner 20. Head 22 comprises a vacuum fan motor 24, a bottom 25 and a transversely extending, floor-contacting rotating brush member 26 which is connected for rotation to a shaft (not shown) within an opening 27 in bottom 35. Motor 24 provides motive force to rotate brush 26 by means of, for example, a belt (not shown). Mounted on the cleaning head is a housing having a cyclonic dust separation unit, indicated generally at 28. Cyclonic unit 28 may comprise any type of dirt separation cyclone known in the art, e.g. cylindrical or frusto-conical, and may comprise a single stage cyclone or multiple stage cyclone (either in series and/or in parallel). Clean air outlet 40 is in air communication with motor 24 via air exit conduit 41. Upper end 34 of container 30 is sealed, such as by an upper panel 35. A handle 42 and wheels 44 may be provided on cleaner 20 to facilitate movement of the unit for cleaning of a floor, and the like.

Referring to FIGS. 3, 3a, 10 and 11, in this embodiment vacuum cleaner 20 has a floor cleaning head 22, means for moving cleaning head 22 across a floor (eg. wheels 44 which may comprise rear wheels or front and rear wheels), a housing 60 rotatably attached to cleaner head 22, and a handle 42 for moving cleaner 20 across the floor. In this embodiment, cleaning head 22 comprises a forward portion 21 and two rear portions 23 extending rearwardly from the forward portion 21. Rear portions 23 are spaced apart and define a space 118 there between. A valve means 68 (eg. a rotatable valve as is known in the art) is provided in cleaning head 22 so as to connect downstream portion 50 of air conduit 46 in air flow communication with upstream portion 48 of air conduit 46 when housing 60 is rotated rearwardly in the direction of arrow B in which position vacuum cleaner 20 is configured for use for cleaning a floor. Housing 60 houses at least one cyclone separator. In this embodiment, cyclonic separator unit 28 uses one cyclone separator, namely container or cyclone bin 30. It will be appreciated that a second stage filtration means, which may comprise a single stage cyclone or multiple stage cyclone (either in series and/or in parallel), may be positioned downstream from container 30 such as in cavity 62. If the second stage filtration means comprises a plurality of cyclones, then the second stage cyclones are preferably in parallel. The treated air travels upwardly from clean air outlet 40 to motor 24 either directly or through a secondary filtration stage which may optionally be positioned in cavity 62. The cleaned air may then exit housing 60 via outlet 116 or it may first optionally pass through chamber 144, which may contain a further filtration means (eg. a HEPA™ filter).

Cyclonic unit 28 comprises at least a first cyclone container or bin 30 having an air inlet 56, preferably at upper end 34 thereof, adapted for providing an air flow tangentially to an inner dirt rotation surface 36 of container 30. Air inlet 56 may be configured to provide an axial flow of air to container 30 and opening 32 at the downstream end of air inlet 56 may have vanes to impart cyclonic flow to the air stream. Preferably, inlet 56 is configured to introduce the air tangentially to container 30. Container 30 also has a dirt collection surface or bottom 38 and a clean air outlet 40.

Figure 4:
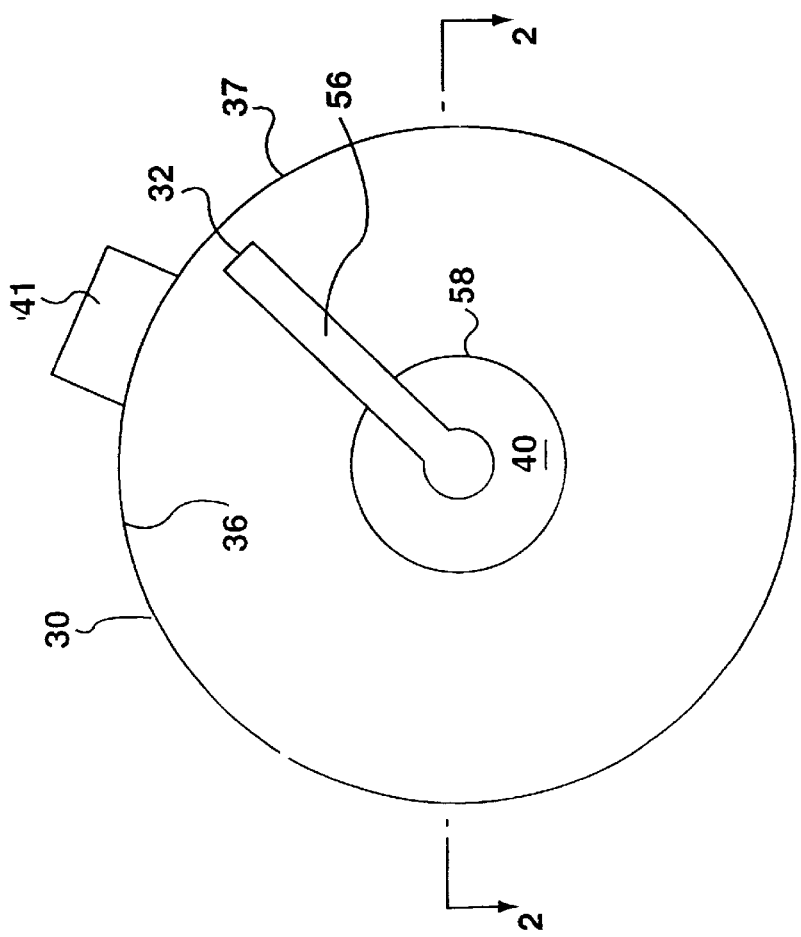
FIG. 4 is a cross-section along line 4—4 in FIG. 2.

In the embodiment of FIG. 2, conduit 41 may be positioned exterior to container 30. In a preferred embodiment, conduit 41 is provided on outer surface 37 of container 30 as shown in FIGS. 4, 18 and 20. In such an embodiment, conduit 41 is preferably provided as a one piece assembly with container 30 (eg. it may be made integrally therewith or it may be made separately and then mounted to outer surface 37 such as by being welded thereto or by being removably attached thereto by mechanical locking means provided on outer surface 37) so that conduit 41 is removable from housing 60 automatically with container 30. Alternately, conduit 41 may be positioned within container 30 (either centrally as shown in FIG. 6, or adjacent surface 36 as shown in FIGS. 8, 12, 14 and 16). Further, the treated air may optionally exit the vacuum cleaner at any desired location if it is not required to cool the motor.

The air flow path through cleaner 20 commences with an air supply conduit 46 having an upstream portion 48 and a downstream portion 50. Upstream portion 48 is provided in head 22 and has a first end 52 positioned adjacent brush member 26 or the like for receiving the dirt laden air and a distal second end 54. Downstream portion 50 has a upstream end 64 which is positioned in air flow communication with second end 54 and a downstream end 66. Preferably ends 54 and 64 are substantially sealed together to prevent air and dirt leaking there from.

Figure 23:
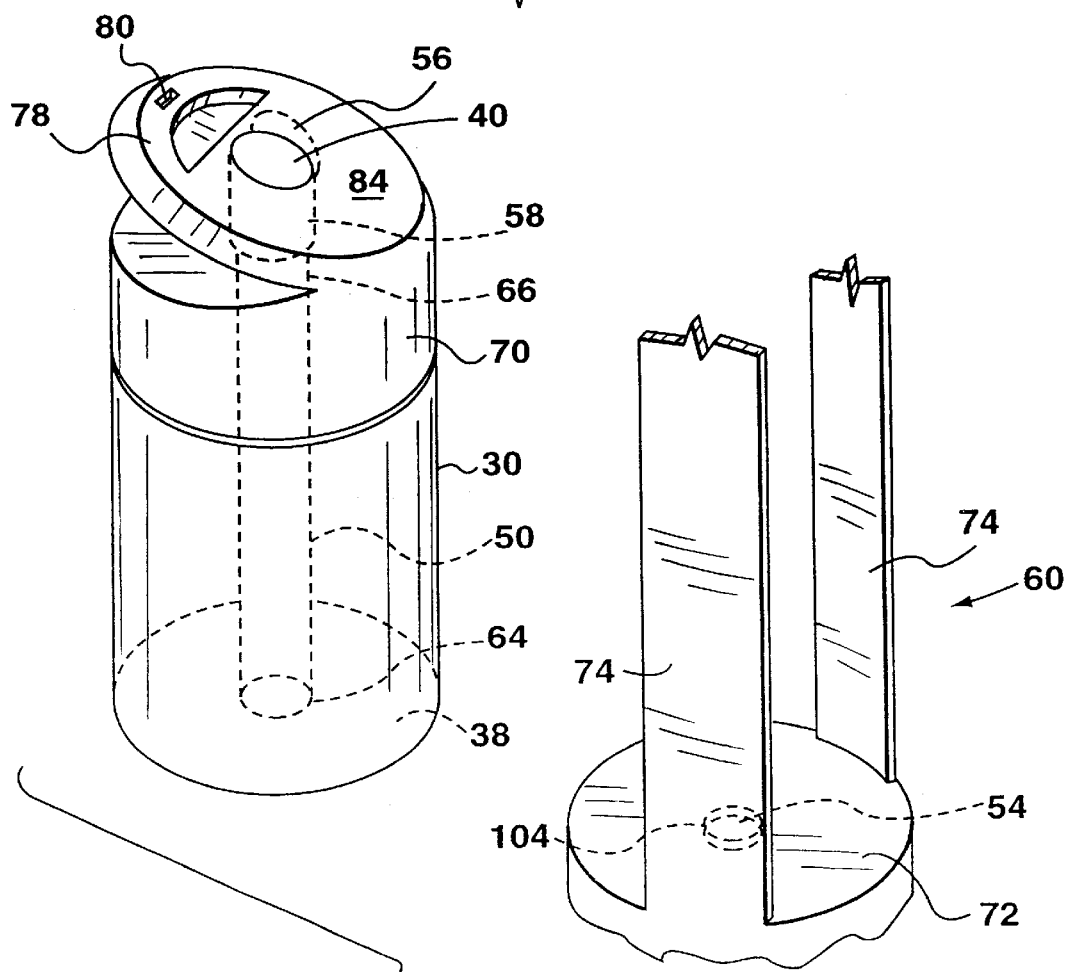
FIG. 23 is an exploded view of the cyclone chamber and housing of the vacuum cleaner of FIG. 3.

In one embodiment, upstream and downstream portions 48, 50 may comprise a single member (whether integrally formed or connected together to form a continuous flow path). In such a case, a separated dirt collection means may be positioned below container 30 or portions 48, 50 may be flexible so as to allow cyclone container 30 to be removed from housing 60 and emptied. In another embodiment, upstream and downstream portions 48, 50 are separate elements and downstream portion 50 is removable with container 30 from housing 60 such that portions 48, 50 are in air flow communication when container 30 is mounted in housing 60 of vacuum cleaner 20. Thus, if a blockage develops in conduit 46, by removing container 30 from housing 60 as shown in FIG. 23, portions 48 and 50 may be individually accessed at ends 54 and 64 to clean out the blockage.

As shown in FIGS. 2, 3, 6, 8, 10, 12, 14 and 16 downstream portion 50 may extend upwardly through container 30. Alternatively, as shown in FIGS. 18 and 20, downstream portion 50 may extend upwardly at a position adjacent outer surface 37 of container 30. Whether downstream portion 50 is provided internally or externally to container 30, by manufacturing the vacuum cleaner so that downstream portion 50 is removable with container 30 from housing 60 (i.e. in a single operation), access is provided at ends 54 and 64 in case of a blockage. Accordingly, multiple access ports are effectively provided as part of the construction of the vacuum cleaner. It will be appreciated that downstream portion 50 may be manufactured as part of container 30 (such as by moulding it integrally therewith). Alternatively, it may be separately manufactured (such as by extrusion) and subsequently affixed to container 30 by any means known in the art (eg. by welding, engagement of male and female engagement members of the like). In either event, downstream portion 50 and container 30 are a one piece assembly so that when container 30 is removed from housing 60, downstream portion 50 is automatically removed at the same time.

Downstream portion 50 may enter container 30 at any point (eg. via a side wall) but preferably enters through bottom 38. Further downstream portion 50 preferably extends generally upwardly through the central portion of container 30 which comprises the area occupied by the vertical return path of the fluid as it travels from bottom 38 to outlet 40. As shown in FIGS. 2 and 3$a$, downstream portion 50 preferably extends coaxially with the longitudinal axis A of container 30, however, it may be positioned off centre either internal of container 30 (see for example FIG. 12) or external of container 30 (see for example FIGS. 18 and 20). Since downstream portion and container 30 define a complete container for the separated dirt, an advantage of this invention is that, when it is desired to empty container 30, a complete dirt container is removed from the vacuum cleaner in a single step operation.

Downstream portion 50 is preferably positioned at any location within container 30 where it does not unduly interfere with the cyclonic flow of air within container 30. For this reason, if downstream portion 50 is positioned within container 30, it is preferably centrally located in container 30. In particular, in a cyclone, the air travels generally in an annular band adjacent surface 36 of container 30. The air travels generally downwardly until it reaches a position towards bottom 38 of container 30 at which point the air travels upwardly through the central portion of cyclone container 30. In a most preferred embodiment of this invention, downstream portion 50 is positioned within this central portion of container 30 through which this up flow of air passes.

As shown in FIGS. 12, 14 and 16, downstream portion 50 may be positioned adjacent sidewall 36. In such cases, downstream portion 50 is preferably constructed so as to minimize its interference with the flow of air around surface 36. For example, downstream portion 50 may be constructed with rounded surfaces so as to direct the flow of air around downstream portion 50. Further, downstream portion 50 need not be circular in shape but may be elliptical or of other constructions wherein it has a circumferential width (i.e. around inner surface 36) which is substantially greater than its radial width in a direction transverse thereto (i.e. radially inwardly). Thus, downstream portion 50 would extend only slightly into container 30 and would not substantially interfere with the cyclonic flow of air in container 30. If conduit 41 is positioned adjacent inner surface 36, it is also preferably so shaped. It will be appreciated than downstream portion 50 and conduit 41 may be positioned on opposed portions of inner surface 36 (see FIG. 12) or at any other location, such as adjacent each other (see FIG. 14).

In another embodiment, downstream portion 50 and outlet 40 may be nested one within the other. For example, as shown in FIGS. 6 and 7, downstream portion 50 may be positioned within, and preferably co-axially within, conduit 41. Alternately, conduit 41 may be positioned within, and preferably co-axially within, downstream portion 50. As shown in FIG. 16, conduits 41 and 50 may be provided in a nested relationship adjacent surface 36. It will also be appreciated that conduits 41 and 50 may be positioned adjacent each other, for example, adjacent inner surface 36 as shown in FIG. 14, or within the central portion of container 30 (not shown). Further, they may be nested within each other or positioned adjacent each other when located adjacent the exterior of container 30 as shown in FIGS. 18 and 20.

Air inlet 56 is positioned at the upper end of downstream portion 50. Opening 32 is positioned at the distal end of air inlet 56 from end 66 of downstream portion 50. Air inlet 56 defines the exit portion of the air supply conduit extending longitudinally with the cyclone and may extend along any desired path from downstream portion 50 to opening 32. Preferably, air inlet 56 is wholly positioned within container 30 (eg. it does not exit or enter the container 30 through upper end 34).

Air inlet 56 may extend at a right angle to downstream portion 50 as shown in FIG. 2. Further, it may extend in a straight line to opening 32 as shown in FIG. 4. It will be appreciated that opening 32 may be any inlet known in the cyclonic art to introduce air tangentially into a cyclone and it may be positioned at any point along the longitudinal length of container 30 as is known in the cyclonic art.

Typically vacuum cleaners utilize 90° elbows to redirect an air flow from one plane to a plane at right angles thereto. In particular, the air travels in a first direction when it enters an elbow and then, when it encounters the wall of the elbow, it is directed to travel in a second direction which is at 90° to its first line of travel. The axis of flow of the inlet and the outlet from a 90° elbow are at right angles and exist in a single plane. In order to change the direction of travel of the air into another direction, a second 90° elbow is used. With a cyclone inlet, in is generally necessary to redirect an air flow through two planes (i.e an axial flow to a lateral flow and the lateral flow to a tangential flow). A first 90° elbow is used to redirect the air from an axial flow to a lateral flow into a cyclone and a second 90° elbow is used to redirect the lateral flow into a tangential flow.

Figure 5:
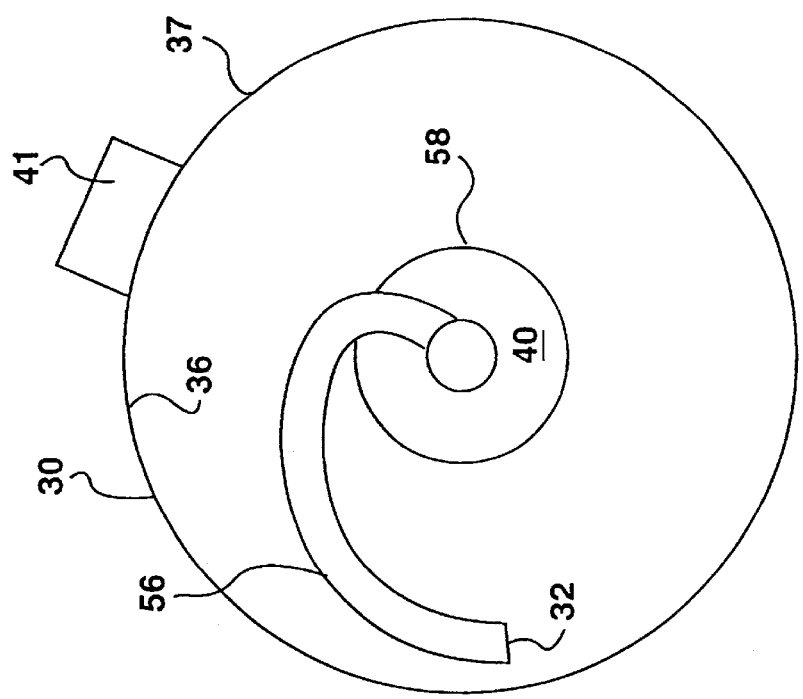
FIG. 5 is a cross-section along line 4—4 in FIG. 2 of an alternate preferred embodiment.
Figure 26:
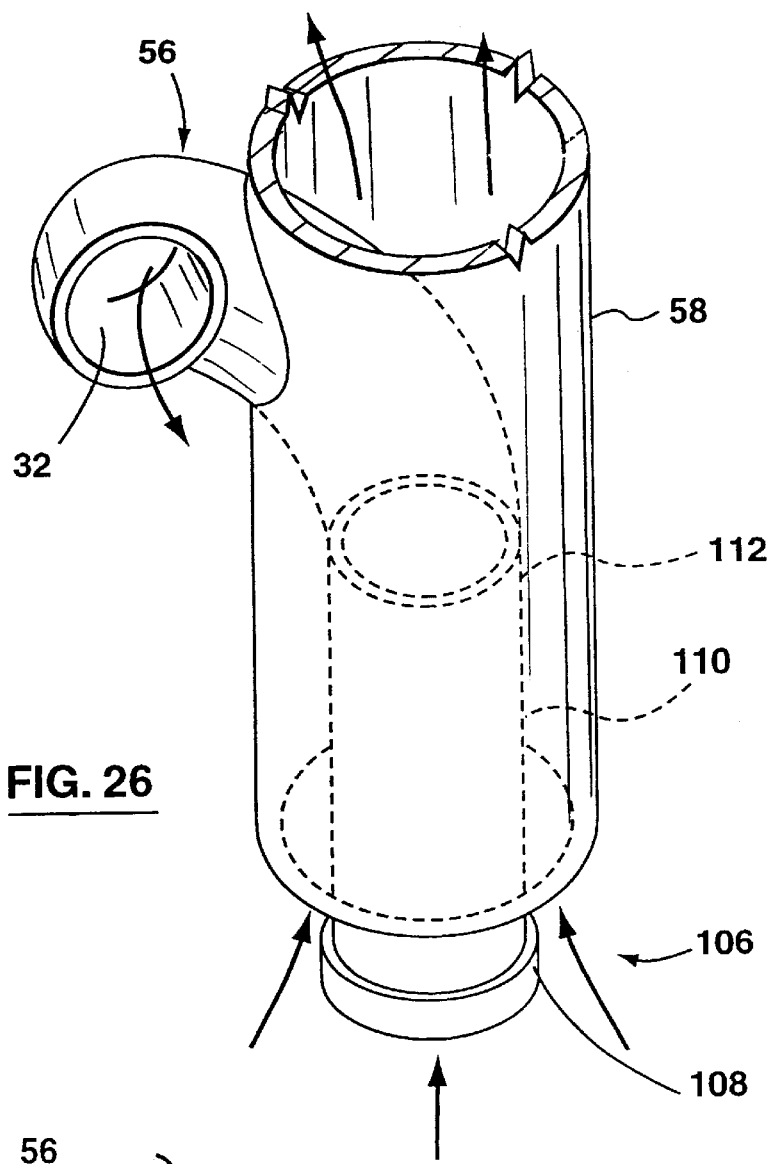
FIG. 26 is an enlargement of the upper portion of the downstream portion of the air supply conduit of the vacuum cleaner of FIG. 3.

In one preferred embodiment, air inlet 56 is constructed so as not to have any 90° elbows. Instead, air inlet 56 includes curved portions for redirecting the air so as to impart circular momentum to the dirty air as it travels there through (as shown in FIG. 5) and/or, air inlet 56 includes a curved portion for redirecting the air from an axial flow to flow outwardly to inlet 32 (as shown in FIG. 26). By constructing the supply conduit in this manner, 90° elbows are not required to redirect the dirty air to flow outwardly or to redirect the dirty air to enter container 30 tangentially. In a typical application, replacing a 90° elbow with a gradual curved path to redirect the dirty air results in a about a 5 to 10% reduction in the loss of suction as the air travels through the vacuum cleaner. Thus, a smaller motor may be incorporated into the vacuum cleaner to obtain the same pressure at opening 32 or the suction at end 52 may be increased if the same motor is used.

Referring to FIG. 3a, it will be appreciated that the dirty air travelling in downstream portion 50 must travel outwardly to inlet 56. In the preferred embodiment of FIG. 3a, air inlet 56 curves gently from downstream end 66 of downstream portion 50 so as to travel outwardly and generally radially towards opening 32. More preferably, the change in direction of the dirty air from generally vertical to generally horizontal and from generally horizontal to generally tangential occurs so as to reduce the pressure drop during its travel from downstream portion 50 to container 30. Accordingly, the curved portion of inlet 56 is curved to direct the dirty air from travelling generally vertically to generally tangentially. This may be achieved by gradually redirecting the air from a generally vertical flow (assuming the axis A of the cyclone is vertical) to a generally horizontal flow and then from the generally horizontal flow to a generally tangential flow or alternately by gradually redirecting the air from a generally vertical flow (assuming the axis A of the cyclone is vertical) to a generally tangential flow and then from the generally tangential flow to a generally horizontal flow. These redirections may occur sequentially (in either order) or, preferably, at least a portion of these redirections occurs simultaneously. Further the curved portion of the inlet may be a continuous curve so as to continually impart changes to the direction of the dirty air travelling there through or it may have a straight portion incorporated therein. Preferably, it defines a continuously curved member.

In accordance with a preferred embodiment of this invention, three dimensional inlet 56 can be considered as an envelope built around a space time. Every point on the space curve is a centre of the cross section of the envelope built around it. The curve can be defined by $S(x,y,z)$. The curve joins together two points in space not by a straight line but by means of a curve or, preferably a helical curve or other related curve wherein the gradient of the space curve has at least two non-zero components which vary along the arc length of the curve.

Figure 30:
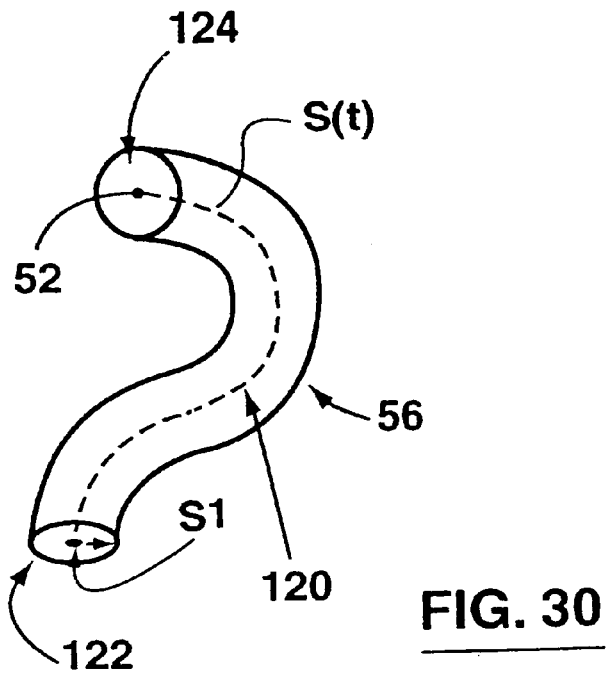
Figure 30A:
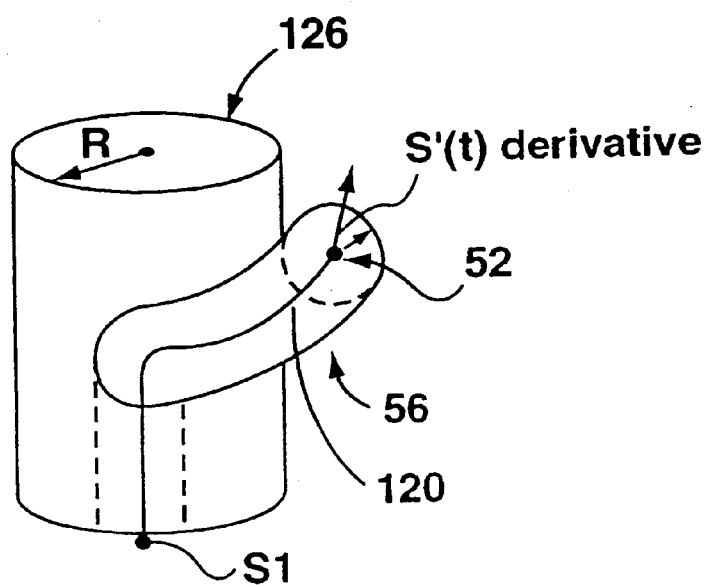

Referring to FIGS. 30 and 30a, inlet 56 is a duct or conduit comprising an envelope formed by a radius r out from a central space curve 120 having an upstream end 122 and a downstream end 124 and which is itself formed about an imaginary cylinder 126. This cylinder is imaginary in the sense that it is used for the purpose of mathematically constructing the conduit. The central space curve 120 begins and ends at the points S1 and S2. The imaginary (construction) cylinder 126 has a radius R. Radii r and R may themselves be varied as functions of $(x,y,z)$ provided that the duct has a radius r where r<R functions. The helical segment of the space curve 120 around which the duct is formed can therefore be defined by $S(t)=(G)*(\cos(t), \sin(t), t)\cdot(x,y,z)$ such that the gradient of the space curve 120 has at least two non-zero components which vary along the arc length of the curve 120. Furthermore, t1<t<t2 and $S(t1)$ is equal to S1 and $S(t2)$ is equal to S2. The space curve at S1 smoothly becomes a straight line coincident with the construction cylinder's axis C of the construction cylinder. The space curve 120 at S2 smoothly becomes a straight line coincident with the derivative of $S(t)$ at point S2 with respect to the parameter t.

It will be appreciated that this duct may be used with any fluid stream (liquid or gaseous) and need not be used in association with a cyclone separator. In particular, the three dimensional duct may be used whenever it is desired to alter the direction of travel of a fluid through more than one plane. Thus, the three dimensional duct may be used with a fluid stream that has entrained particulate matter such as a dirty air flow stream to a vacuum cleaner (cyclonic or otherwise) or with a fluid stream which does not contain any material to be separated but is flowing through a system.

Centrally located in upper end 34 of container 30 is a clean air outlet 40 for permitting withdrawal of air from container 30, as will be described below. From clean air outlet 40, the air flow may proceed, if desired, to a second stage of filtration, such as a second cyclone or other filtration means (not shown). Subsequently, it may be in air flow communication with vacuum fan motor 24 via air exit conduit 41. Head 22 has an exhaust port (not shown) for expelling clean air to the environment.

In operation, the vacuum fan motor 24 is activated to induce an air flow through cleaner 20. The air flow causes a partial vacuum to form at end 52. Air, and entrained dirt, is drawn into upstream portion 48, with the aid of brush member 26. The dirty air flow moves vertically in downstream portion 50 to opening 32 in air inlet 56 and is introduced tangentially to container 30. The airflow is then accelerated around dirt rotation surface 36, and proceeds generally downwardly along and around dirt rotation surface 36 until it reaches a position towards bottom 38 of container 30, at which point the air flow travels upwardly through the central portion of cyclone container 30. Wall 58 may provide an extension of outlet 40 in container 30. Wall 58 assists in preventing the treated air travelling upwardly to outlet 40 from mixing with the dirty air which is introduced into container 30 via inlet 56.

As can be seen by a comparison of intake conduits 16 and 46, of cleaner 10 and cleaner 20 respectively, the reduction of bends in the air conduit of the present invention beneficially results in a significant reduction in the turbulent pressure loss in the intake conduit, thereby markedly improving the efficiency of the cyclonic separation device as a whole.

The presence of downstream portion 50 extending through the centre of container 30 interferes minimally with the cyclonic action of the air flow within container 30. Thus the presence of downstream portion 50 does not significantly effect the efficiency of the cyclone.

Figure 22:
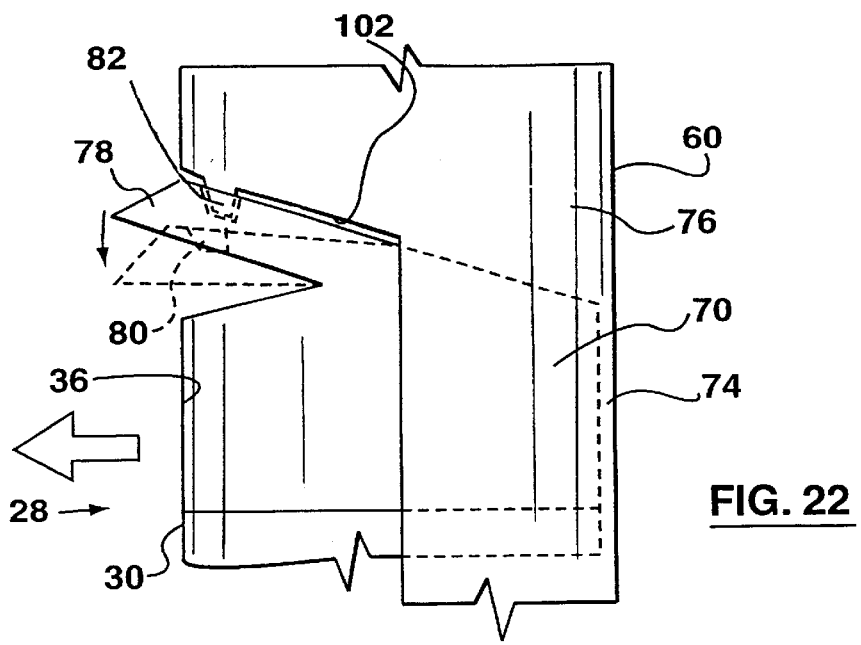
FIG. 22 is an enlargement of the upper portion of the cyclone chamber when positioned in the housing of the vacuum cleaner of FIG. 3.

The removability of container 30 from housing 60 of vacuum cleaner 20 is more particularly shown by reference to FIGS. 3a, 22 and 23. Housing 60 comprises a base 72, an upper portion 76 and struts 74 which extend between base 72 and upper portion of housing 76 so as to define a cavity within which container 30 is received. It will be appreciated that housing 60 may be of any configuration which provides an area in which bin 30 may be received. For example, it will be appreciated that if vacuum cleaner 20 is a canister vacuum cleaner, that container 30 may extend horizontally, or at any inclined angle to the horizontal and housing 60 may be of any shape within which container 30 may be received.

Container 30 may be lockingly received in housing 60 by any means known in the art. In the preferred embodiment, container 30 is provided with a lid 70 which has a recess 80 provided in handle 78 thereof. Container 30 and lid 70 comprise a cyclone chamber which is removable received in housing 60. Lower surface 102 of upper portion 76 of housing 60 is provided with a protrusion 82 which is receivable in recess 80. By moving handle 78 downwardly to the position shown in dotted outline in FIG. 22, protrusion 82 is removed from recess 80 allowing bin 30 to be removed from base 72 as is shown in FIG. 23. Recess 80 and protrusion 82 are a male and female detent means. It will be appreciated that other male and female detent means or the like which are known in the art may be utilized so that container 30 may be releasably lockingly received in housing 60.

In the embodiment of FIG. 3a, the cleaned air travels upwardly out above container 30. Accordingly, lid 78 is provided with an upper surface 84. Cylindrical wall 58 extends downwardly from upper surface 84. The intersection of upper surface 84 and wall 58 describes opening 40 which is the clean air outlet.

As can be seen in FIG. 23, downstream portion 50 of air supply conduit 46 is removed from housing 60 with container 30. In this embodiment, downstream portion 50 comprises a centre feed tube. Upstream end 64 is removable from downstream end 54. Sealing means, such as O-ring 104 may be provided to join ends 54 and 64 in air flow communication when bin 30 is replaced in housing 60 so as to prevent any leak or any substantial leak where ends 54 and 64 meet.

Figures 24, 25:
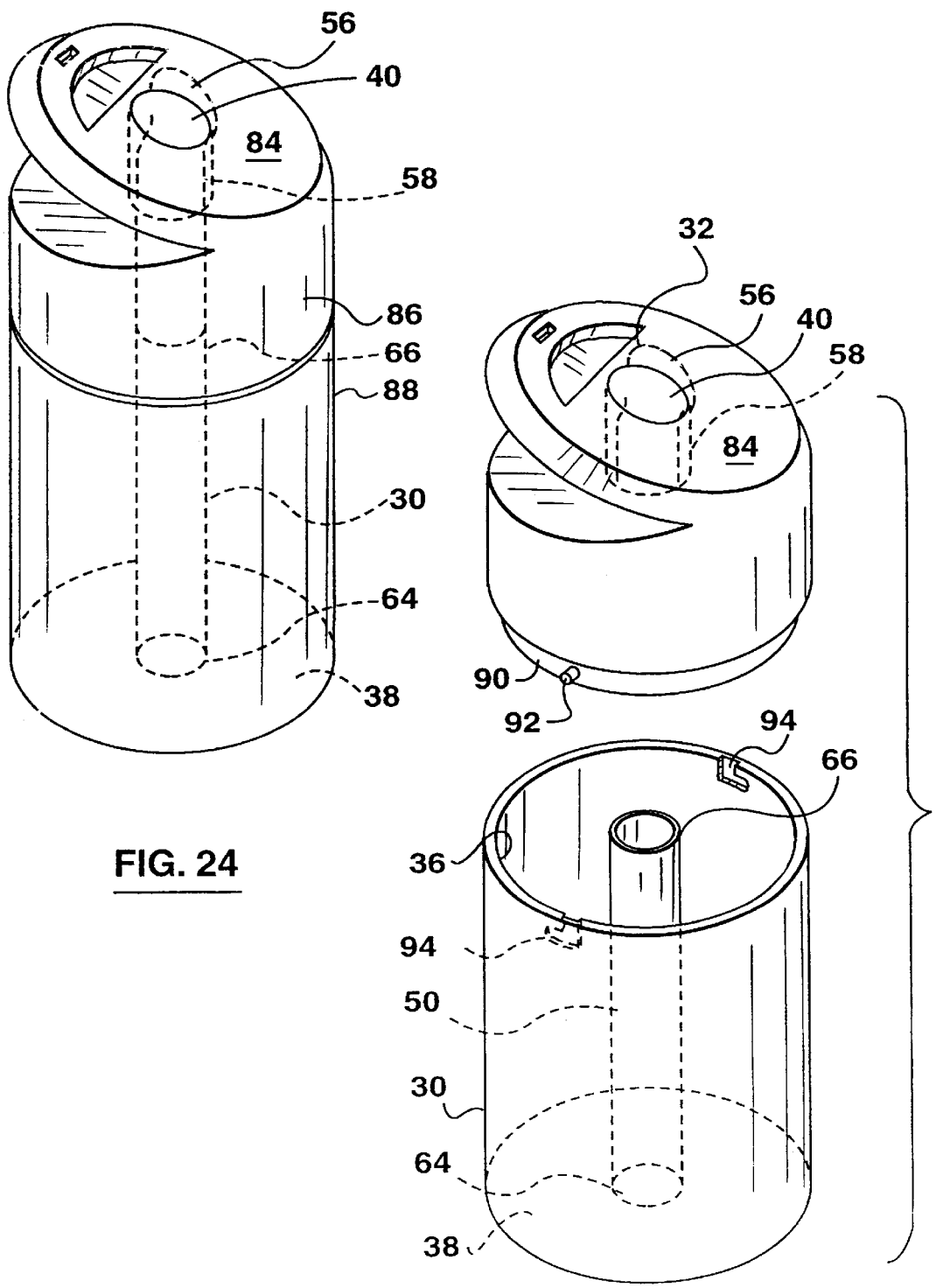
FIG. 24 is a perspective view of the cyclone chamber when removed from the housing of the vacuum cleaner of FIG. 3.
FIG. 25 is an exploded view of the cyclone chamber of FIG. 24.

Lid 70 may be releasably mounted to container 30 by any means known in the art. Referring to FIG. 25, lower end 86 of lid 70 is provided with a recessed surface 90 having two protrusions 92 provided therein. Upper end 88 of container 30 is provided with bayonet mounts 94 for receiving protrusions 92. Accordingly, once container 30 is removed from housing 60, lid 70 is rotated slightly counter clockwise so as to release the bayonet mount whereby lid 70 may then be lifted from container 30 thus allowing container 30 to be emptied.

As further exemplified in FIG. 25, in the preferred embodiment, air inlet 56 is removed with lid 70 from container 30. The construction of air inlet 56 is more particularly shown in FIGS. 26–29. Referring to the preferred embodiment of FIG. 26, it can be seen that air inlet 56 comprises a three dimensionally curved member which curves first upwardly and outwardly from centre feed tube 50 through wall 58 into the interior of container 30 which functions as the cyclone chamber. Inlet 56 then continues to curve outwardly and radially so as to provide a tangential air inlet to container 30.

Downstream end 66 of centre feed tube 50 is in air flow communication with end 106 of air inlet 56. End 106 is provided with a means such as a collar 108 into which end 66 is received so as to join inlet 56 in air flow communication with centre feed tube 50. It will be appreciated that any other means known in the art may be used to join centre feed tube 50 in air flow communication with air inlet 56.

Figure 27:
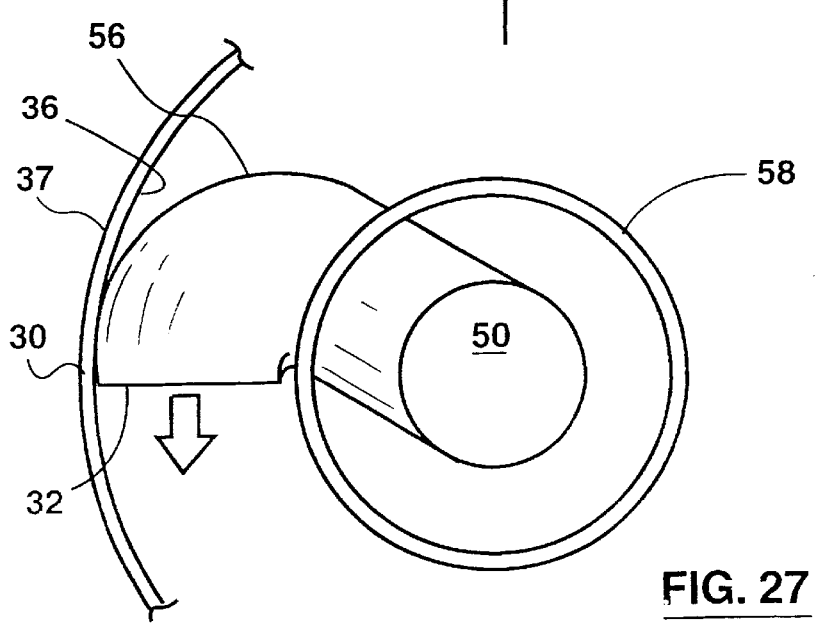
FIG. 27 is a top plan view of the upper portion of the downstream portion of the air supply conduit of FIG. 26.
Figure 28:
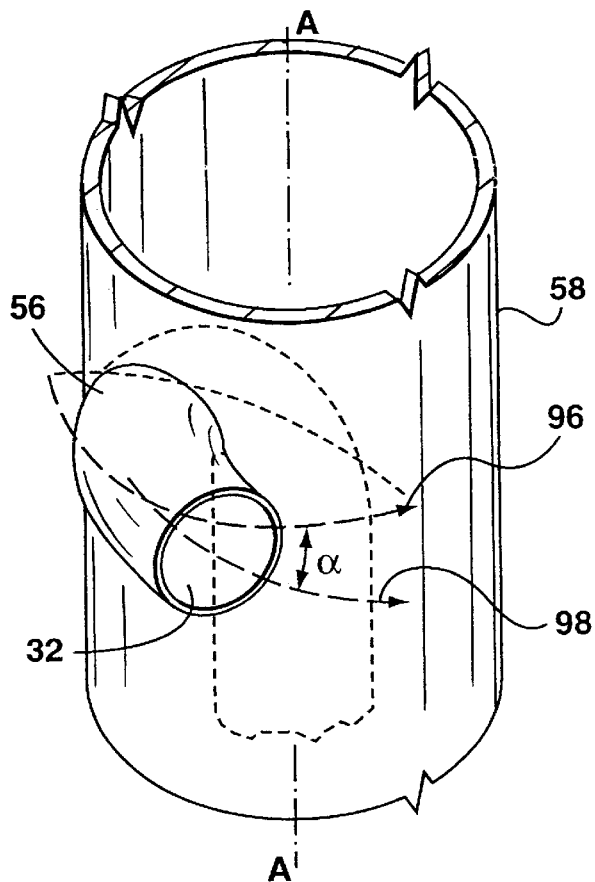
FIG. 28 is an alternate embodiment of the upper portion of the downstream portion of the air supply conduit of FIG. 26.

Referring to FIGS. 26 and 27, it can be seen that air inlet 56 has a longitudinally extending portion 110 at the end of which is the curved inlet portion which ends at opening 32. In this embodiment, the curved inlet portion comprises a continuous three dimensional curve from upper end 112 of longitudinally extending portion 110 through to the distal end which contains opening 32.

Figure 29:
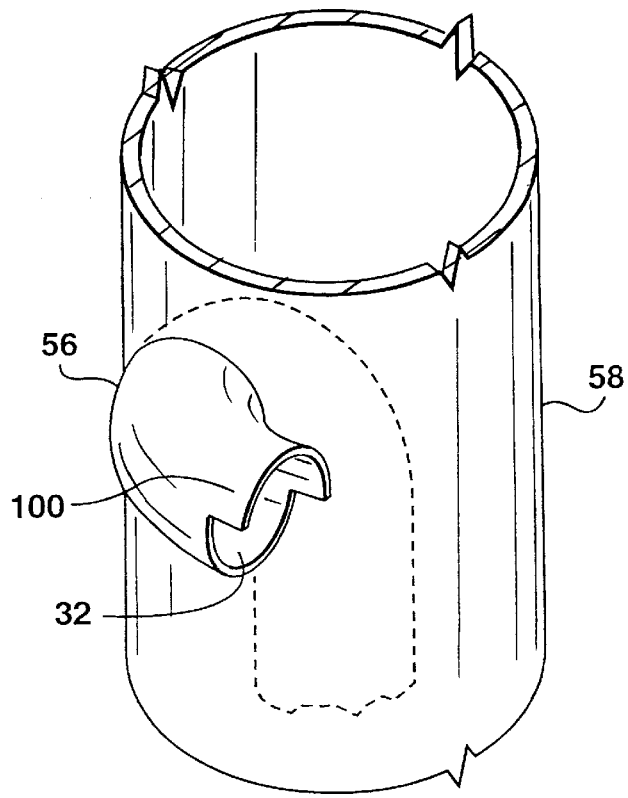
FIG. 29 is a further alternate embodiment of the upper portion of the downstream portion of the air supply conduit FIG. 26; and, FIG. 30 and 30a are an embodiment demonstrating the construction of a three dimensional curve according to another aspect of the instant invention.

In a further alternate embodiment, as shown in FIG. 29, the distal end of inlet 56 may have an extension member 100 provided on the upper portion thereof. It will be appreciated that extension member 100 may be provided either in the embodiment of FIG. 26 or in the embodiment of FIG. 28.

Opening 32 and/or extension 100 may extend horizontally (i.e. in a plane transverse to the longitudinal axis A of container 30). In a preferred embodiment, opening 32 extends downwardly at an angle α of about 1 to about 10°, preferably from about 5 to about 10° from the horizontal. In particular, referring to FIG. 28, reference numeral 96 refers to a plane which is at right angles to longitudinal axis A of container 30. Reference numeral 98 defines the axis of opening 32 (i.e. the end portion of curved inlet 56 which extends along axis 98).

The configuration of the air intake conduit according to the present invention advantageously permits a substantial reduction in the pressure loss experienced in the intake conduit without interfering with the overall performance of the cyclone separation device. Thus, the present invention permits a deeper vacuum to be drawn at the intake end 52, for a given vacuum motor size. Conversely, the motor size may be reduced in conjunction with the present invention without losing vacuum power over devices having air intake conduits according to the prior art, thereby permitting a comparable vacuum cleaner to be provided at lesser cost.

In the embodiment of FIG. 3a, it will be appreciated that from second end 54, the dirty air travels upwardly through the filtration stages and exits the vacuum cleaner at the top. In particular, the air travels upwardly to air inlet 56 to cyclonic unit 28. The air then travels upwardly from air outlet 40 to the motor and, if desired, further upwardly to a further filtration stage (eg. a HEPA™ filter) which may be positioned in chamber 114 which is provided in housing 60 above motor 24. Regardless of the sequence of the filtration stages, or their number, the air preferably continues to travel generally upwardly from one stage to the next without 90° elbows being required to direct the air flow.

While the above description constitutes the preferred embodiments, it will be appreciated that the present invention is susceptible to modification and change without departing from the fair meaning of the proper scope of the accompanying claims.

It will be appreciated that if conduit 41 extends to a position adjacent motor 24, then it is preferably constructed from two portions in a similar fashion to supply conduit 46 such that the upstream portion of conduit 41 is removable with container 30 from the vacuum cleaner and is in air flow communication with the downstream portion of conduit 41 (see for example FIG. 6) when container 30 is reinserted into the vacuum cleaner such that the upstream and downstream portions of conduit 41 provide air flow communication for the clean air to travel past the motor to provide cooling therefor.

It will be appreciated by those skilled in the art that various additions and modifications may be made to the instant invention and all of these are within scope of the following claims. For example, the cyclone separator may have a hopper of the like provided in one end thereof for channeling the separated particulate matter to a collection chamber positioned external to the cyclone separator or to for other purposes downstream from the cyclone separator.

We claim:

1. A vacuum cleaner having a source of dirty air to be treated and a housing, the vacuum cleaner comprising:
    (a) a cyclone having a bottom, a fluid inlet, a wall having an inner surface and a longitudinally extending axis; and,
    (b) a fluid supply conduit extending along the length of the cyclone from the bottom to the fluid inlet, the fluid supply conduit conveying the dirty air to the fluid inlet, the fluid supply conduit communicating with the source of dirty air when the cyclonic separator is in use, the fluid inlet redirecting the dirty air to a tangential flow and the fluid inlet includes a curved portion without any 90° elbows.

2. The vacuum cleaner as claimed in claim 1 wherein the fluid supply conduit extends through a central portion of the cyclone.

3. The vacuum cleaner as claimed in claim 2 wherein the fluid supply conduit extends coaxially with the axis of the cyclone and the fluid inlet extends outwardly to the inner surface.

4. The vacuum cleaner as claimed in claim 1 wherein the fluid inlet is positioned within the cyclone.

5. The vacuum cleaner as claimed in claim 1 wherein the fluid inlet comprises at least a portion that extends in a continuous curve.

6. The vacuum cleaner as claimed in claim 1 wherein the fluid inlet is curved in a first direction towards the inner surface of the wall and is curved in a second direction to introduce the dirty air tangentially to the cyclone.

7. The vacuum cleaner as claimed in claim 6 wherein the fluid inlet is curved so as to sequentially redirect the air in the first direction and then the second direction.

8. The vacuum cleaner as claimed in claim 6 wherein the fluid inlet is curved so as to simultaneously redirect the air in the first direction and the second direction.

9. The vacuum cleaner as claimed in claim 1 wherein the fluid inlet has a curved portion to impart a rate of change of direction in the fluid travelling there through in two axis simultaneously.

10. The vacuum cleaner as claimed in claim 9 wherein the fluid supply conduit extends longitudinally through the cyclone and the cyclone is removably mounted in the housing.

11. The vacuum cleaner as claimed in claim 1 wherein the downstream end of the fluid inlet extends substantially horizontally.

12. The vacuum cleaner as claimed in claim 1 wherein the downstream end of the fluid inlet extends towards the bottom of the cyclone.

13. The vacuum cleaner as claimed in claim 1 wherein the downstream end of the fluid inlet extends towards the bottom of the cyclone at an angle of up to 10° from a plane perpendicular to the axis.

14. The vacuum cleaner as claimed in claim 1 wherein the cyclone has an outlet having a wall and a portion of the fluid inlet is nested within the outlet and a portion of the fluid inlet is positioned exterior the outlet.

15. A cyclonic separator having a source of fluid to be treated, the cyclonic separator comprising:
    a cyclone having a bottom, a fluid inlet, a wall having an inner surface and a longitudinally extending axis, the fluid inlet having an upstream end and a downstream end; and,
    a fluid supply conduit extending through the cyclone substantially along the axis of the cyclone from the bottom to the upstream end of the fluid inlet, the fluid supply conduit communicating with the source o:f fluid when the cyclonic separator is in use, the fluid inlet is curved in a first direction towards the wall and is curved in a second direction to introduce the fluid tangentially to the cyclone.

16. The cyclonic separator as claimed in claim 15 wherein the fluid inlet is curved so as to sequentially redirect the air in the first and the second directions.

17. The cyclonic separator as claimed in claim 15 wherein the fluid inlet is curved so as to simultaneously redirect the air in the first direction and the second direction.

18. The cyclonic separator as claimed in claim 15 wherein the fluid inlet has a curved portion to impart a rate of change of direction in the fluid travelling there through in two axis simultaneously.

19. The cyclonic separator as claimed in claim 15 wherein the cyclone has a central portion and the fluid supply conduit extends through the central portion and the fluid inlet is curved in a first direction outwardly towards the inner surface of the wall and is curved in a second direction to introduce the fluid tangentially to the cyclone.

20. The cyclonic separator as claimed in claim 15 wherein the downstream end of the fluid inlet extends substantially horizontally.

21. The cyclonic separator as claimed in claim 15 wherein the downstream end of the fluid inlet extends towards the bottom of the cyclone.

22. The cyclonic separator as claimed in claim 15 wherein the downstream end of the fluid inlet extends towards the bottom of the cyclone at an angle of up to 100 from a plane perpendicular to the axis.

23. The cyclonic separator as claimed in claim 15 wherein the cyclone has an outlet having a wall and at least a portion of the fluid inlet is nested within the outlet and extends through the wall of the outlet.

24. The cyclonic separator as claimed in claim 15 wherein the inlet comprises a duct extending from point S1 to point S2 and comprises a space curve around which the conduit is formed wherein the gradient of the space curve has at least two non-zero components which vary along the arc length of the curve.

25. The cyclonic separator as claimed in claim 24 wherein the space curve comprises a helical segment.

26. The cyclonic separator as claimed in claim 25 wherein the helical segment is defined by S(t)=(G)*(cos(t),sin(t),t)·(x,y,z) whereby
    (a) the gradient of the space curve has at least two non-zero components which vary along the arc length of the curve
    (b) t1<t<t2
    (c) S(t1) is equal to S1; and,
    (d) S(t2) is equal to S2.

27. The cyclonic separator as claimed in claim 26 wherein the duct comprises an envelope formed by a radius r out from the central space curve which is itself formed about a construction cylinder having a radius R and an axis wherein the conduit the duct has a radius r where r<R and the space curve at S1 smoothly becomes a straight line coincident with the axis of the construction cylinder.

28. The cyclonic separator as claimed in claim 27 wherein the space curve at S2 smoothly becomes a straight line coincident with the derivative of S(t) at point S2 with respect to the parameter t.

29. A cyclonic separator having a source of fluid to be treated, the cyclonic separator comprising:
    (a) cyclone separation means having a longitudinally extending axis and a length;
    (b) fluid supply conduit means extending substantially along the length of the cyclone separation means, the fluid supply conduit means communicating with the source of fluid when the cyclonic separator is in use; and,
    (c) fluid inlet means for redirecting the fluid from a substantially axial flow for introduction tangentially to the cyclone means without any 90° elbows.

30. The cyclonic separator as claimed in claim 29 wherein the fluid inlet means comprises at least a portion that extends in a continuous curve.

31. The cyclonic separator as claimed in claim 29 wherein the cyclone separation means has a wall, the fluid inlet means is curved in a first direction towards the wall and is curved in a second direction to introduce the fluid tangentially to the cyclone separation means.

32. The cyclonic separator as claimed in claim 29 wherein the fluid supply conduit means extends longitudinally through the cyclone separation means.

33. The cyclonic separator as claimed in claim 29 wherein the cyclone separation means has a central portion and a wall having an inner surface, and the fluid supply conduit means extends through the central portion and the fluid inlet means redirects the fluid in a first direction outwardly towards the inner surface of the wall and redirects the fluid in a second direction to introduce the fluid tangentially to the cyclone separation means.

34. The cyclonic separator as claimed in claim 29 further comprising housing means for removably receiving the cyclonic separation means wherein the cyclone separation means has outlet means having a wall and a portion which is removable with the cyclone separation means from the housing means and the fluid inlet means passes through the wall of the outlet means.

35. The cyclonic separator as claimed in claim 29 wherein the fluid supply conduit means has a curved portion to impart a rate of change of direction in the fluid travelling there through in two axis simultaneously.

36. A method comprising:
    (a) providing a fluid having a first element and a second element;
    (b) conveying the fluid in a conduit longitudinally through a cyclone having a longitudinal axis and a longitudinally extending surface;
    (c) conveying the fluid in a conduit tangentially to the longitudinally extending surface; and,
    (d) introducing the fluid into the cyclone and passing the fluid through the cyclone to remove at least a portion of the first element from the fluid and obtain at least one treated stream having a reduced concentration of the first element.

37. The method as claimed in claim 36 wherein step (b) further comprises conveying the fluid centrally through the cyclone.

38. The method as claimed in claim 37 further comprising conveying the fluid around at least a portion of the longitudinal axis of the cyclone as the fluid passes outwardly from the central portion.

39. The method as claimed in claim 37 further comprising providing centrifugal acceleration to the fluid as it passes outwardly from the central portion.

40. The vacuum cleaner as claimed in claim 1 wherein the fluid inlet comprises a duct extending from point S1 to point S2 and comprises a space curve around which the duct is formed wherein the gradient of the space curve has at least two non-zero components which vary along the arc length of the curve.

41. The vacuum cleaner as claimed in claim 40 wherein the space curve comprises a helical segment.

42. The vacuum cleaner as claimed in claim 41 wherein the helical segment is defined by S(t)=(G)*(cos(t),sin(t),t)·(x,y,z) whereby
    (a) the gradient of the space curve has at least two non-zero components which vary along the arc length of the curve
    (b) t1<t<t2
    (c) S(t1) is equal to S1; and,
    (d) S(t2) is equal to S2.

43. The vacuum cleaner as claimed in clam 42 wherein the duct comprises an envelope formed by a radius r out from the central space curve which is itself formed about a construction cylinder having a radius R and an axis wherein the duct has a radius r where r<R and the space curve at S1 smoothly becomes a straight line coincident with the axis of the construction cylinder.

44. The vacuum cleaner as claimed in claim 43 wherein the space curve at S2 smoothly becomes a straight line coincident with the derivative of S(t) at point S2 with respect to the parameter t.

45. A cyclonic separator having a source of fluid to be treated, the cyclonic separator comprising a cyclone having a bottom, a fluid inlet, a cyclone wall having an inner surface and an outlet having an outlet wall, the fluid inlet having an upstream end and a downstream end, and at least a portion of the fluid inlet is nested within the outlet and extends through the wall of the outlet and the fluid inlet comprises a duct extending from point S1 to point S2 and comprises a space curve around which the duct is formed wherein the gradient of the space curve has at least two non-zero components which vary along the arc length of the curve.

46. A method comprising:
(a) providing a fluid having a first element and a second element;
(b) conveying the fluid to a cyclone;
(c) introducing the fluid through an inlet to the cyclone to impart a rate of change of direction in the fluid travelling there through, the inlet comprises a duct extending from point S1 to point S2 and comprises a space curve around which the duct is formed wherein the gradient of the space curve has at least two nonzero components which vary along the arc length of the curve whereby the space curve does not include a 90° elbow; and,
(d) passing the fluid through the cyclone to remove at least a portion of the first element from the fluid and obtain at least one treated stream having a reduced concentration of the first element.

47. The method as claimed in claim 46 wherein the cyclone has a longitudinally extending axis and step (b) further comprises conveying g the fluid longitudinally through the cyclone.

48. The method as claimed in claim 47 further comprising conveying the fluid around at least a portion of the longitudinal axis of the cyclone as the fluid passes outwardly from the central portion.

* * * * *

UNITED STATES PATENT AND TRADEMARK OFFICE
CERTIFICATE OF CORRECTION

PATENT NO. : 6,391,095 B1
DATED : May 21, 2002
INVENTOR(S) : Conrad et al.

It is certified that error appears in the above-identified patent and that said Letters Patent is hereby corrected as shown below:

Column 14,
Line 28, before "a cyclone" insert -- (a) --
Line 32, before "a fluid supply" insert -- (b) --
Line 64, delete "100" and insert -- 10° --

Column 17,
Line 14, delete "nonzero" and insert -- non-zero --

Column 18,
Line 8, delete "conveying g the" and insert -- conveying the --

Signed and Sealed this

Twelfth Day of August, 2003

JAMES E. ROGAN
*Director of the United States Patent and Trademark Office*